April 26, 1932.  H. E. WHITE  1,855,736
MOTOR CONTROL SYSTEM
Filed March 6, 1929    2 Sheets-Sheet 1
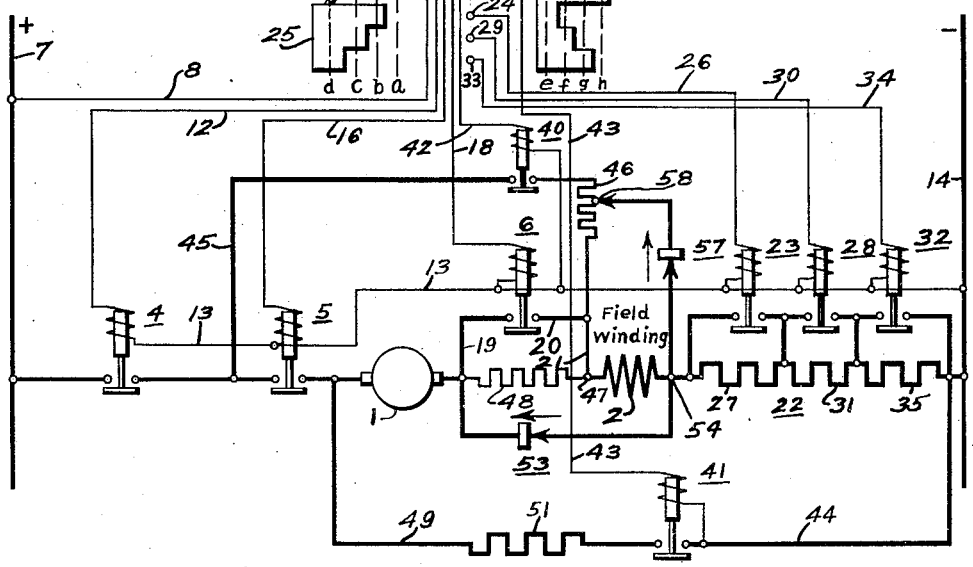
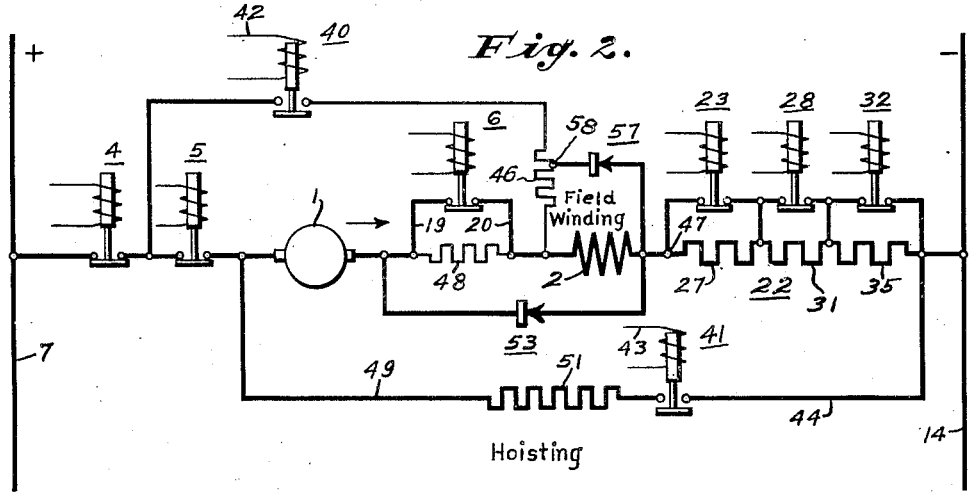
INVENTOR
Harold E. White
BY
ATTORNEY April 26, 1932.    H. E. WHITE    1,855,736
MOTOR CONTROL SYSTEM
Filed March 6, 1929    2 Sheets-Sheet 2

INVENTOR
Harold E. White
BY
ATTORNEY

Patented Apr. 26, 1932

1,855,736

UNITED STATES PATENT OFFICE

HAROLD E. WHITE, OF WILKINSBURG, PENNSYLVANIA, ASSIGNOR TO WESTINGHOUSE ELECTRIC & MANUFACTURING COMPANY, A CORPORATION OF PENNSYLVANIA

MOTOR CONTROL SYSTEM

Application filed March 6, 1929. Serial No. 344,728.

The invention relates generally to control systems for electric motors and particularly to a system suitable for controlling the operation of hoist motors.

An object of the invention is to provide a control system for electric motors that shall be simple in construction and efficient in its operation.

Another object of the invention is to provide for obtaining a series-motor characteristic from an electric motor when hoisting a load and a shunt-motor characteristic when lowering a load.

A further object of the invention is the provision of a control system for motors which permits the lowering of any heavy loads at approximately the same speed.

A still further object of the invention is to provide for varying the field excitation of a motor, when connected for operation as a shunt-motor in accordance with the counter voltage developed by its armature.

And a still further object of the invention is to provide for so controlling the flow of current through the field winding of a motor, when connected for operation as a shunt motor, that the motor will develop a high starting torque.

When electric motors are applied to hoist service and particularly to that class of service in which the motors may be required to raise or lower light and heavy loads indiscriminately, it is desirable that the motors have a series-motor speed-torque characteristic for raising or hoisting the loads and a shunt-motor characteristic when lowering them.

It is also very desirable that, when lowering the loads, the motor shall develop a high starting torque in order that light loads may be accelerated rapidly in the downward direction.

In order to attain the objects and the desirable motor-operating characteristics mentioned above, a control system has been provided in accordance with the invention whereby the field and armature windings of an electric motor may be connected in series-circuit relation to obtain a series-motor speed-torque characteristic when loads are raised or hoisted and in parallel circuit relation with reference to each other so that the motor will develop a shunt-motor speed-torque characteristic when lowering loads.

In order to provide for rapid or high acceleration of loads in the downward direction, means are embodied in the control system for increasing the flow of current through the field winding of the motor during the period that the motor armature is started from rest and accelerated to its running speed. The control system also comprises means for increasing the flow of current through the field winding in accordance with the voltage developed by the motor armature when the load has overhauled the motor and caused it to operate as a generator.

For a fuller understanding of the invention, reference may be had to the following description, taken in conjunction with the accompanying drawings, in which:

Fig. 1 is a schematic illustration of circuits and apparatus arranged in accordance with the invention, Fig. 2 is a simplified illustration of the control system showing the motor connected for operation as a series motor.

Figure 3:
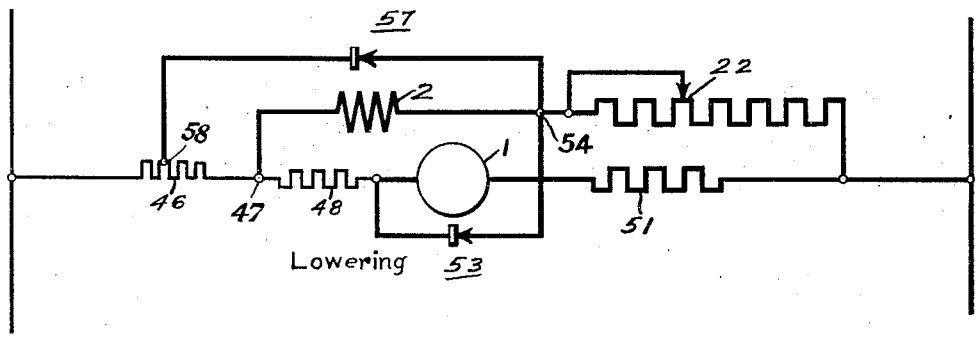
Fig. 3 is a simplified schematic illustration showing the motor connected for operation as a shunt motor.

In the drawings, a motor is shown provided with an armature 1 and a field winding 2. The motor shown is particularly adapted for hoisting service.

When motors are utilized in hoisting service, it is highly desirable that the armature 1 and field winding 2 shall be connected in series-circuit relation in order that a series-motor speed-torque characteristic may be obtained when loads are raised or hoisted. It is also desirable to connect the armature 1 and the field winding 2 of the motor in parallel-circuit or shunt relation in order that the motor shall develop a shunt-motor characteristic when loads are being lowered.

In order to provide for operating the motor either as a series or a shunt-connected motor, a controller 3 is provided.

As shown, the controller 3 comprises left and right-hand sections. The left-hand section is disposed to control the operation of the motor when the armature 1 and the field winding 2 are connected in series-circuit relation, and the right-hand section is arranged to control its operation when the armature 1 and the field winding 2 are connected in parallel or shunt-circuit relation.

If it be assumed that a load is to be hoisted by the motor, the controller 3 is actuated to position $a$, in which position energizing circuits are established for switches 4, 5 and 6. The energizing circuit for the switch 4 may be traced from supply conductor 7, through conductor 8, contact fingers 9 and 10, bridged by segment 11 of the controller 3, conductor 12, the actuating coil of switch 4 and conductor 13, to the negatively energized supply conductor 14. Therefore, the switch 4 is closed.

The energizing circuit established for the switch 5 may be traced from the positively energized supply conductor 7, through conductor 8, contact fingers 9 and 15, bridged by the controller segment 11, conductor 16, the actuating coil of the switch 5 and conductor 13, to the negatively energized supply conductor 14. Therefore, the switch 5 is closed.

The energizing circuit established for the switch 6 may be traced from the positively energized conductor 7, through conductor 8, contact fingers 9 and 17, bridged by the controller segment 11, conductor 18, the actuating coil of switch 6 and conductor 13, to the negatively energized supply conductor 14.

When the switches 4, 5 and 6 have been closed, a motor circuit is established which extends from the positively energized conductor 7, through the switches 4 and 5, the armature 1, conductor 19, the contact members of switch 6, conductors 20 and 21, field winding 2 and starting resistor 22, to the negatively energized supply conductor 14. The armature 1 and field winding 2 are now connected in series-circuit relation and the motor will operate as a series motor.

In order to accelerate the motor, the controller may be actuated from position $a$ through positions $b$ to $d$ inclusive. When the controller is in position $b$, a circuit is established for the actuating coil of an accelerating switch 23 that extends from the supply conductor 7, through conductor 8, contact fingers 9 and 24, bridged by controller segments 11 and 25, conductor 26, the actuating coil of the switch 23 and supply conductor 13, to the negatively energized conductor 14. Therefore, switch 23 is closed and a section 27 of the resistor 22 is shunted. When this section of the resistor is shunted, the voltage applied to the motor is increased to thereby increase its speed.

When the controller 3 is actuated to position $c$, an energizing circuit is established for a second accelerating switch 28 that extends from the positively energized conductor 7, through conductor 8, contact fingers 9 and 29, bridged by the controller segments 11 and 25, conductor 30, the actuating coil of the switch 28 and the conductor 13, to the negatively energized supply conductor 14. Therefore, the switch 28 is closed and a section 31 of the resistor 22 is shunted or short-circuited. The voltage impressed on the motor is, therefore, increased to effect an increase in the speed of the motor.

Full running speed is attained, when the controller 3 is actuated to position $d$, whereby an energizing circuit for the actuating coil of a third accelerating switch 32 is established. The energizing circuit for the coil of the switch 32 may be traced from the positively energized conductor 7, through conductor 8, contact fingers 9 and 33, bridged by controller segments 11 and 25, conductor 34, the actuating coil of switch 32 and conductor 13, to the negatively energized supply conductor 14. The switch 32 is, therefore, closed and section 35 of the resistor 22 is short-circuited. Full voltage is, therefore, applied to the motor and it will operate at its full running speed.

Assuming that a load is to be lowered by the motor, then the armature 1 and field winding 2 may be connected in parallel or shunt-circuit relation with reference to the supply conductors 7 and 14, so that the motor will operate as a shunt motor.

In order to connect the armature 1 and the field winding 2 in parallel-circuit relation, the controller 3 may be actuated to position $e$. In this position, contact fingers 9 and 10, 36, 37, 24, 29 and 33 are bridged by segments 38 and 39, and energizing circuits for the actuating coils of switches 4, 40, 41, 23, 28 and 32 are established. It is to be noted that switches 5 and 6, which were closed when the motor was operating as a series motor, are opened when the controller is actuated to the right to reverse the motor and connect it for operation as a shunt machine. The energizing circuits for the actuating coils of switches 4, 23, 28 and 32 may be traced in the manner hereinbefore set forth and need not be repeated here.

The energizing circuit for the actuating coil of the switch 40 may be traced from the positively energized supply conductor 7, through conductor 8, contact fingers 9 and 36 bridged by controller contact segments 38 and 39, conductor 42, the actuating coil of switch 40 and conductor 13, to the negatively energized supply conductor 14. Therefore, the switch 40 is closed.

The energizing circuit for the actuating coil of switch 41 extends from the positively energized supply conductor 7, through conductor 8, contact fingers 9 and 37—bridged by the controller contact segments 38 and 39—conductor 43, the actuating coil of the switch 41 and conductor 44, to the negatively energized conductor 14. Therefore, the switch 41 is closed.

When the switches 4, 40, 41, 23, 28 and 32 have been closed, a motor circuit is established which extends from the positively energized conductor 7, through the contact members of the switch 4, conductor 45, the contact members of the switch 40, resistor 46, the junction point 47, resistor 48, the motor armature 1, conductor 49, resistor 51, the contact members of the switch 41 and conductor 44, to the negatively energized supply conductor 14. This circuit may be designated as the motor-armature circuit.

The exciting circuit for the field winding 2 may be traced from the junction point 47, through the field winding 2, the contact members of the switches 23, 28 and 32, to the negatively energized conductor 14.

If the controller 3 is actuated through circuit-controlling positions $f$, $g$, and $h$, respectively, the energizing circuits for the switches 23, 28, and 32 will be deenergized in succession. The sections 27, 31 and 35 of the resistor 22 are thereby reconnected into the circuit of the field winding 2 step-by-step until the motor, operating as a shunt machine, has been accelerated to its full running speed.

In order that the advantages of the present invention may be readily understood, reference will be made to the functioning of the system, illustrated without the addition of the features added by the inventor. Assuming that the operator or motorman actuates the controller 3 through the positions $e$ to $h$, inclusive, very quickly so that the entire resistor 22 will be connected into series-circuit relation with the field winding 2 before the armature 1 has commenced to rotate, then the resistance of the field-winding circuit, extending from the junction point 47 through the resistor 22 to the negatively energized conductor 14, may be from 3 to 600 times greater than the resistance of the motor-armature circuit which extends from the junction point 47 through the resistor 48, the armature 1 and the resistor 51 to the negatively energized conductor 14. When such a condition exists, the current through the motor-armature circuit may be from 3 to 600 times greater than the current flowing through the field-winding circuit. Therefore, it is obvious that the motor will not develop a starting torque which will be sufficient to start and accelerate the load in the downward direction. For this reason light loads will not be accelerated rapidly in the down direction, and heavy loads may be lowered at an excessive and dangerous speed.

Therefore, in order to insure that the motor shall develop a high starting torque sufficient to accelerate light loads, as well as heavy loads, at a high rate, from standstill, in the downward direction, provision is made for strengthening the magnetic field of the motor by increasing the flow of current through the field winding 2 in the event that the controller 3 is actuated quickly to its full running position, namely, position $h$, before the armature has commenced to turn.

In order to effect an increase in the current flow through the field winding, under such starting conditions, an asymmetric shunt 53 is provided. The resistance of the asymmetric shunt 53 to current flow, in the direction indicated by the arrow, is usually very low and, preferably, of a value approximately equal to the value of the resistance of the field winding 2 but its resistance to current flow in the opposite direction is very high. Therefore, when the resistor 22 has been connected in circuit with the field winding 2 before the motor armature 1 has commenced to rotate and is developing no counter electro-motive force, the resistance from junction point 54, that is, the point of connection between the field winding 2 and the resistor 22, through the asymmetric shunt 53, the motor armature 1, the resistor 51, the contact members of the switch 41 and the conductor 44, to the negatively energized supply conductor 14 is from 2 to 600 times less in ohmic value than the resistance from the junction point 54 through the resistor 22 to the negatively energized supply conductor 14. Therefore, it is obvious that a current of large value will flow through the field winding 2, as well as the armature 1 under the condition existing when the entire resistor 22 has been connected in series-circuit relation with the field winding 2 before the motor armature 1 has commenced to rotate. The motor will, therefore, develop a high starting torque because the product of the field-winding ampere turns and the armature ampere turns will be relatively high.

As the motor armature 1 commences to rotate, it will develop a counter voltage which will be dependent upon the speed at which the motor is lowering the load. When the motor has attained its normal running speed, the current flowing through the asymmetric shunt 53 will be materially decreased, because of the increase in the counter voltage developed by the motor armature 1, the current flowing through the field winding 2 will therefore, be decreased, and, in practice, the current will be approximately equal to the value of current which would flow through the field winding if the asymmetric shunt were disconnected. It will be observed from the above description that the asymmetric shunt 53 will regulate the flow of current through the field winding 2 in accordance with the counter voltage of the armature 1.

In some cases, where heavy loads are lowered the loads may overhaul the motor and cause it to act as a generator. If the load is very heavy, the lowering speed may tend to become excessive because of the fact that the armature may not develop sufficient counter voltage to retard or limit the lowering of the load to a safe speed. In order to insure that all loads, and particularly heavy loads, shall be lowered at a safe speed, means are provided for increasing the field strength of the field winding 2 approximately in accordance with the current developed by the motor when acting as a generator.

The particular means shown in the drawings for increasing the flow of current through the field winding 2 comprises an asymmetric shunt 57.

As shown, the asymmetric shunt 57 is connected to the junction point 54 to a predetermined point on the resistor 46. As in the case of the asymmetric shunt 53, the resistance of the asymmetric shunt 57 to current flow, in the direction indicated by the arrow, is relatively low, but the resistance to current flow in the opposite direction is relatively high. By properly positioning the connection 58 of the asymmetric shunt 57 to the resistor 46, the resistance of the circuit extending from the junction point 47, through the field winding 2, junction point 54 and the asymmetric shunt 57, to the point 58 may be made much lower than the resistance of the circuit extending from the junction point 47, through the resistor 46, to the connection point 58.

If the motor is acting as a generator and returning current to the source of power, designated as the supply conductors 7 and 14, the field winding 2 will be energized in accordance with the voltage, and, consequently, with the amount of current developed by the motor when acting as a generator. Therefore, it will be observed that the motor, when acting as a generator, will develop a greater retarding tractive effort when heavy loads are lowered than when light loads are lowered. Accordingly, light loads will be lowered at approximately the same speed as heavy loads.

The ohmic value of the resistors 46, 48 and 51 may be so proportioned that the current flowing through the armature 1 and the field winding 2, when the motor is operating as a shunt motor, will be approximately equal to the current flowing through the armature and field windings when they are connected in series-circuit relation for operation as a series motor, and developing its full or rated horse power.

It is to be observed that, when current is flowing through the asymmetric shunt 53, and the motor is operating as a motor to lower loads, the field winding 2 will be energized substantially in accordance with the current flowing through the motor armature 1. Therefore, it will be apparent that, when accelerating loads under the condition when the controller 3 is actuated to the position $h$ before the motor armature has commenced to rotate, the motor will develop a tractive effort approximately that of a series-connected motor. But, when the counter voltage of the motor 1 has been increased to a value commensurate with the motoring speed counter voltage, substantially no current will flow through the field winding 2, by reason of the asymmetric shunt 53, because the voltage drop from the junction point 54, through the resistor 22 to the supply conductor 14, will be materially less than the voltage drop from the same point through the shunt 53, the armature 1 and the resistor 51 to the conductor 14. Accordingly, the motor will operate as a shunt motor.

It is also to be observed that, when the motor is connected as a shunt motor and is lowering loads and the motor is acting as a generator, no current will flow through the asymmetric shunt 53 because the resistance to current flow in the direction opposite to that indicated by the arrow is very high. Therefore, the magnetic field developed by the field winding 2 will not be weakened during the period when the motor is operating as a generator.

Figure 4:
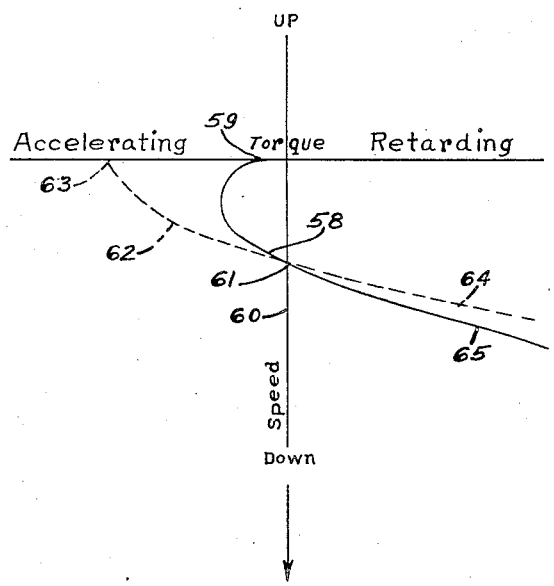
Fig. 4 is a comparative graphic representation of the speed-torque characteristic of a shunt motor and of a motor provided with a control system arranged in accordance with the invention.

In Fig. 4 of the drawings, a curve 58 represents graphically the speed-torque characteristic of the ordinary shunt motor which is not provided with auxiliary circuits, including the asymmetric shunts 53 and 57. It will be observed that the torque developed by the motor under the condition when the controller 3 is actuated to position $h$ and before the motor armature has commenced to rotate, is very low and practically zero, as indicated at 59. As the curve indicates, the torque gradually increases as the speed in the downward direction increases. After the speed-torque curve crosses the speed reference axis 60, as indicated at 61, it tends to straighten out, indicating the speed of the load in the downward direction is approaching a constant value.

Curve 62, shown in broken lines, represents the speed-torque characteristic of a motor the field and armature windings of which are connected in shunt or parallel-circuit relation and provided with asymmetric shunts 53 and 57 and circuits arranged in accordance with the invention, as illustrated in Figs. 1, 2 and 3. It is to be observed that the torque, as indicated at 63, when the motor is starting from rest, is very high, as compared with the torque, indicated at 59, which would be developed if the asymmetric shunts 53 and 57 were not utilized.

Since the motor develops the high starting torque, as indicated by the value at 63, the load will be accelerated downwardly at a rapid rate but the motor will commence to act as a generator at substantially the same speed, in the downward direction as the ordinary shunt motor, as indicated at 61. It will also be observed that portion 64 of the curve 62 lies considerably above the portion 65 of the curve 58, which indicates that a motor, connected for operation in accordance with the invention herein disclosed, tends to retard the loads with more effectiveness than when the usual or simple shunt-motor connection is utilized.

When a motor is connected for shunt operation in accordance with the invention, as here-in disclosed, the speed-torque curve of the motor will be substantially the same for all values of load and will follow aproximately in accordance with the representation illustrated by the curve 62.

By the invention, a control system has been provided for motors, particularly adapted to hoisting service, whereby they may be operated as series motors for hoisting loads and as shunt motors for lowering them. When operating as shunt motors, the loads may be lowered at substantially the same rate, irrespective of the size of the loads. The above shunt-motor-operating characteristic is obtained because the field winding of the motor is energized substantially in accordance with the current traversing the motor armature when loads are accelerated and during the period of operation when loads are lowered and the motor is acting as a generator.

Various modifications may be made in the invention herein disclosed without departing from the spirit and the scope thereof. It is desired, therefore, that the description and drawings disclosing the invention shall be interpreted in an illustrative but not in a limiting sense.

I claim as my invention:

1. In a control system, in combination, a motor having armature and field windings, means disposed to connect said windings in parallel-circuit relation, a resistor arranged to be connected in series-circuit relation with the field winding, and asymmetric means interconnecting the armature and field windings, said asymmetric means being disposed to provide a circuit including said field and armature windings, in which the current varies in accordance with the voltage developed by the armature winding of said motor.

2. In a control system, in combination, a motor having field and armature windings, means disposed to connect the armature and field windings in parallel-circuit relation whereby the motor may be operated either as a series or as a shunt machine, and electrically asymmetric means arranged to interconnect the armature and field windings of said motor, to provide a series-motor circuit in which the current will vary with the voltage developed by the armature, to give the characteristics of a series-connected machine at low speeds and as a shunt machine at full speed.

3. In a control system, in combination, a motor having field and armature windings, means for providing independent circuits for said armature and field windings, means for varying the resistance of said field winding circuit to control the speed of the motor, and electrically asymmetric circuit means arranged to interconnect the field and armature windings to provide an auxiliary series-motor circuit, in which the current flowing will depend upon the counter voltage of said armature winding when the resistance of the field winding circuit is of a relatively high value.

4. In a control system, in combination, a motor having field and armature windings, means for providing independent circuits for said armature and field windings, means for varying the resistance of said field-winding circuit to control the speed of the motor, and asymmetric means arranged to interconnect the field and armature windings to provide an auxiliary circuit for energizing the field windings, in which the current will vary in accordance with counter voltage of said armature winding.

5. In a control system, in combination, a motor having field and armature windings, means for providing independent circuits for said armature and field windings, means for varying the resistance of said field-windings circuit to control the speed of the motor, and asymmetric means arranged to interconnect the field and armature windings to provide a circuit including the field and armature windings, the effective resistance of which interconnected circuit will vary in accordance with voltage developed by said armature winding when the resistance of the field winding circuit is of a relatively high value.

6. In a motor control, in combination, a motor having armature and field windings, means for establishing independent circuits for said armature and field windings, means for varying the resistance of the field-winding circuit to control the speed of the motor, and an electrically asymmetric auxiliary series-motor circuit disposed to vary the current flowing through the field windings as a direct function of the voltage developed by the motor armature.

7. In a control system, in combination, a motor having field and armature windings, means disposed to connect the armature and field windings in either series or parallel-circuit relation to operate the motor either as a series or as a shunt machine, resistors for controlling said armature and field windings, and asymmetric circuit means interconnecting one of said resistors, the field windings and the armature to provide an auxiliary circuit in which the current varies with the counter voltage of the machine when the field and armature windings are connected to give shunt-motor characteristics in operation.

8. In a control system, in combination, a motor having field and armature windings and a plurality of resistors for controlling the electrical operating characteristics of said windings, means disposed to connect the armature and field windings in either series or parallel-circuit relation, and asymmetric circuit means responsive to the counter voltage of the armature interconnecting said armature and field windings and resistors for automatically regulating the flow of current through the field winding of the motor when operating as a shunt machine.

9. In a control system, in combination, a motor having field and armature windings, means disposed to connect the armature and field windings in either series or parallel-circuit relation, a resistor connected in series-circuit relation with the field windings when the motor is operating as a shunt machine and means disposed to connect the field windings in an electrically asymmetric auxiliary circuit, said asymmetric circuit including the armature windings and the field windings and connecting means having electrocal characteristics that automatically control the excitation of the field windings as a function of the counter voltage of the armature.

10. In a control system, in combination, a motor having armature and field windings, means disposed to connect said windings in either series or parallel-circuit relation, whereby either series or shunt-motor operation may be effected, a resistor arranged to be connected in series-circuit relation with the field windings when the armature and field windings are connected to effect shunt-motor operation, and asymmetric circuit means, having a common terminal with the resistor and field windings, interconnecting the resistor, field windings and armature windings whereby the effective resultant resistance of the armature, field windings and circuit means varies in response to the counter voltage of the armature windings of the motor.

11. In a control system, in combination, a motor having armature and field windings, means disposed to connect said windings in parallel-circuit relation, to obtain shunt-motor characteristics in operation, an intermediate circuit, a variable resistor arranged to be connected in series-circuit relation through said intermediate circuit, said intermediate circuit being located between the field windings and the resistor, and asymmetric means interconnecting said intermediate circuit with the armature windings to provide an auxiliary series-circuit, extending through the field windings, the asymmetric means and the armature windings, in which auxiliary circuit the current varies with the voltage developed in the armature windings of the motor.

12. In an electrical control system for a motor having armature and field windings, in combination with means for providing independent circuits for said armature and field windings and for providing series-motor circuits therefor, means for varying the resistance of the field-winding circuit to control the speed of the motor, and an auxiliary series-motor circuit having such electrical characteristics that the current flow through the field windings is automatically varied as a direct and continuous function of the voltage developed by said armature winding when the motor is acting as a motor and the armature and field windings are connected through said independent circuits.

13. In an electrical control system for a motor having armature and field windings, in combination with means for providing independent circuits for said armature and field windings and for providing series field connections therefor, means for varying the resistance of the field-winding circuit to control the speed of the motor, and an auxiliary series-field circuit having such electrical characteristics that the current flow through the field windings is automatically varied as a direct and continuous function of the voltage developed by said armature winding when the motor is acting as a generator and the armature and field windings are connected through said independent circuits.

14. In an electrical control system for a dynamo-electric machine having armature and field windings, in combination with means for providing independent circuits for said armature and field windings, means for connecting said armature and field windings in series-circuit relation, means for varying the resistance of the field-winding circuit to control the speed of the motor, and auxiliary circuits for connecting the field and armature in series-circuit relation, and having such electrical characteristics that the current flowing through the field windings is automatically varied as a function of the voltage developed by the armature when said armature and field windings are connected through their respective independent circuits, regardless of whether the machine is acting as a motor or as a generator.

In testimony whereof, I have hereunto subscribed my name this 20th day of February, 1929.

HAROLD E. WHITE.